Aug. 5, 1958　　　V. SAKALYS　　　2,845,773
WATCH CASE
Filed Aug. 27, 1956　　　6 Sheets-Sheet 1

INVENTOR.
VYTAUTAS SAKALYS
BY
Dike, Thompson & Sanborn
ATTORNEYS

Aug. 5, 1958  V. SAKALYS  2,845,773
WATCH CASE
Filed Aug. 27, 1956  6 Sheets-Sheet 2

INVENTOR.
VYTAUTAS SAKALYS
BY
Dike, Thompson & Sanborn
ATTORNEYS

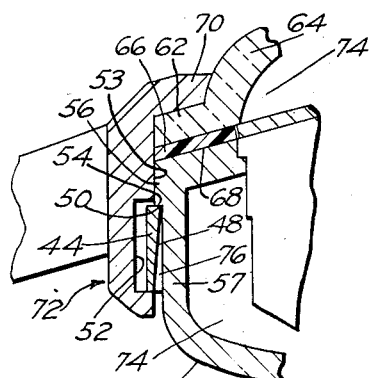
FIG. 11
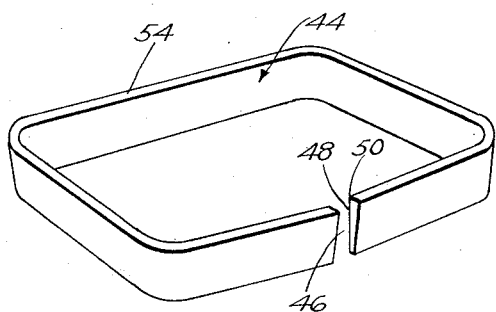
FIG. 12
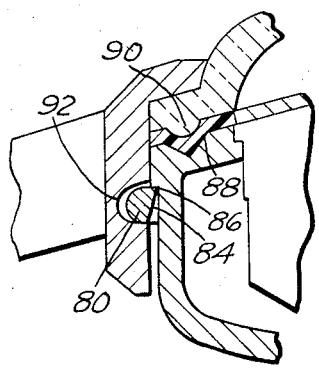
FIG. 13
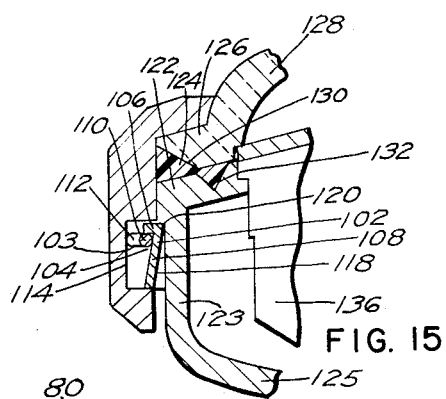
FIG. 15
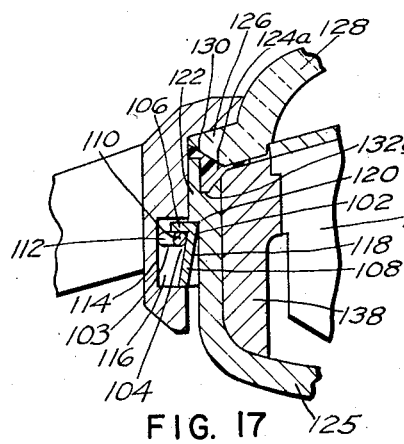
FIG. 17
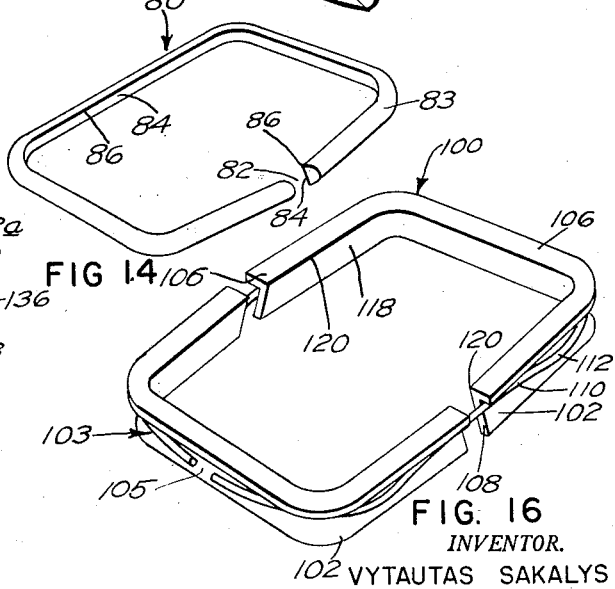
FIG. 14
FIG. 16
INVENTOR.
VYTAUTAS SAKALYS
BY Dike, Thompson & Sanborn
ATTORNEYS Aug. 5, 1958   V. SAKALYS   2,845,773
WATCH CASE Filed Aug. 27, 1956   6 Sheets-Sheet 5

INVENTOR.
VYTAUTAS SAKALYS
BY
Dike, Thompson & Sanborn
ATTORNEYS

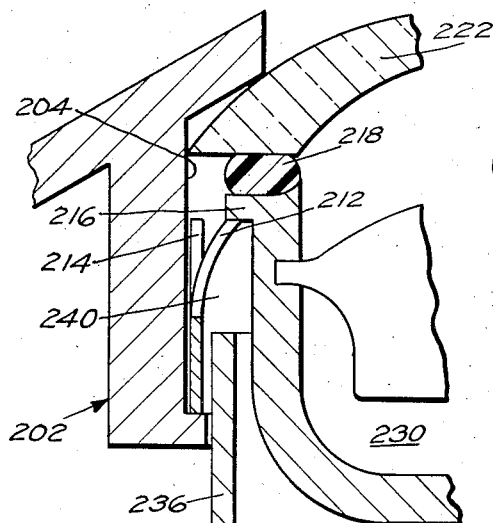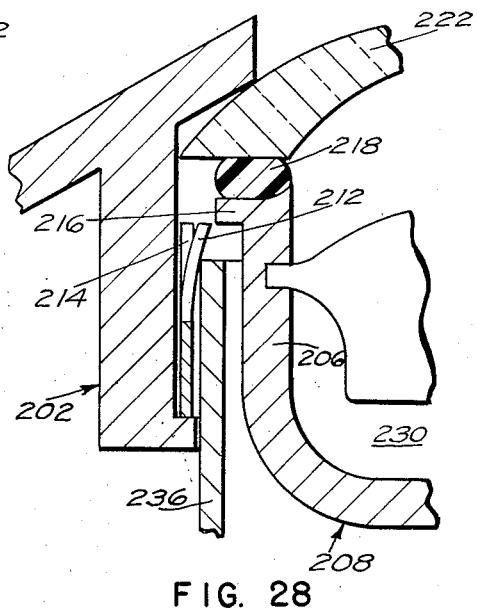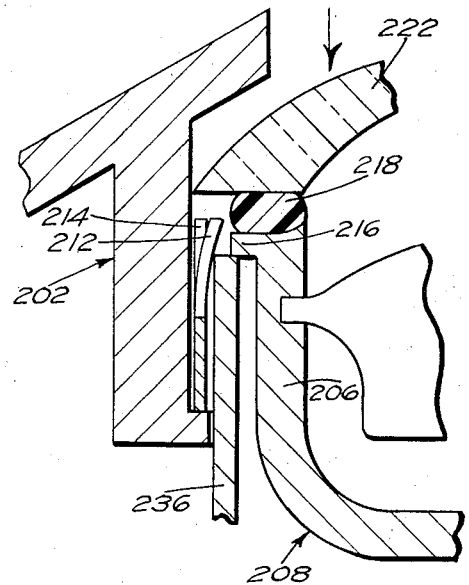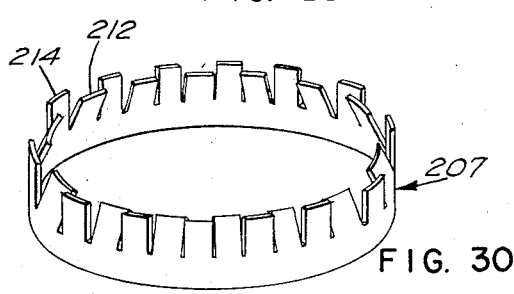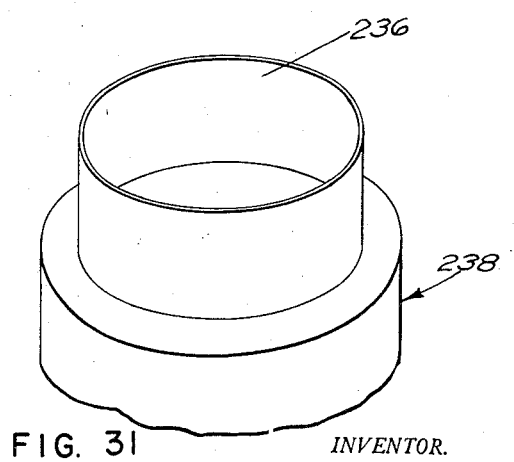
INVENTOR.
VYTAUTAS SAKALYS
BY Dike, Thompson, & Sanborn
ATTORNEYS United States Patent Office 2,845,773
Patented Aug. 5, 1958

2,845,773

WATCH CASE

Vytautas Sakalys, Sag Harbor, N. Y., assignor to Bulova Watch Company, Inc., New York, N. Y., a corporation of New York Application August 27, 1956, Serial No. 606,455

2 Claims. (Cl. 58—90)

The present invention relates to watch cases, especially to water- and dust-proof watch cases comprising at least two hollow members which define an enclosure in which the watch mechanism is located.

Another object of the invention is to provide such a watch case having a simple, inexpensive detent locking mechanism incorporated therein, which is automatically effective to lock the members together, preferably in a water-proof and air-tight manner, when they are moved together to a particular position, which is completely enclosed within the casing when the members are locked together and is not accessible except by insertion into the case of a special release tool, which cannot be released except by the use of such a special tool followed by a special manipulation, which cannot easily be tampered with by the user, which does not incorporate threads and which is adapted to be used with irregular shaped (so-called odd-shaped) watch cases, as for example cases which are square shaped, polygonal shaped, oval shaped or have a shape incorporating both straight and curvilinear lines.

Still another object is to provide such a case in which the locking mechanism does not have to be removed in order to release it and open the case but which is replaceable without replacing either of the hollow members.

Still another object is to provide an improved watch case especially of the water-proof and dust-proof type.

Other objects will appear hereinafter.

In accordance with the present invention the detent mechanism is carried by the wall of a cavity in one of the members for receiving a side wall of another member. The portion of the side wall which is adjacent to the cavity opening in which it is received is spaced from the cavity wall to receive the release tool. When the side wall is in a predetermined position in the cavity, the detent means is resiliently urged into engagement with a detent engaging portion of the side wall to lock such wall in the cavity in such predetermined position. The detent means is movable out of such engagement by inserting the special release tool into the space between the wall of the cavity and the side wall to engage and force the detent means out of engagement with the detent engaging portion whereupon the detent engaging portion of the side wall is movable past the detent means to a position in which it is no longer engageable by the detent means and the side wall is removable from the cavity. To lock the members together again the side wall is moved into the cavity until it reaches the predetermined position whereupon the detent means automatically moves into engagement with the detent engaging portion to lock the members together in such position. Preferably a sealing member is used and the two hollow members are locked into a position in which the enclosure formed by the two hollow members is sealed off from the atmosphere.

In the accompanying drawings:

Fig. 11 is a view similar to Fig. 4 showing a different embodiment of the present invention;

Fig. 12 is a view in perspective of the detent ring of Fig. 11;

Fig. 13 is a view similar to Fig. 4 showing yet another embodiment of the present invention;

Fig. 14 is a view in perspective of the detent ring of Fig. 13;

Fig. 15 is a view similar to Fig. 4 showing yet another embodiment of the present invention;

Fig. 16 is a view in perspective of the detent ring of Fig. 15;

Fig. 17 is a view similar to Fig. 15 showing a different construction of the sealing ring and surfaces coming in contact therewith.

Fig. 27 is a view similar to Fig. 26 showing only half of the case just after the release tool has been inserted therein to release the detent lock;

Fig. 28 is a view similar to Fig. 27 just after the release tool has released the detent lock;

Fig. 29 is a view similar to Fig. 27 after the detent lock has been released and the back of the casing is being removed from the body cavity;

Fig. 30 is a view in perspective of the detent ring of Fig. 27;

Fig. 31 is a view in perspective of the release tool of Fig. 27.

Figure 1:
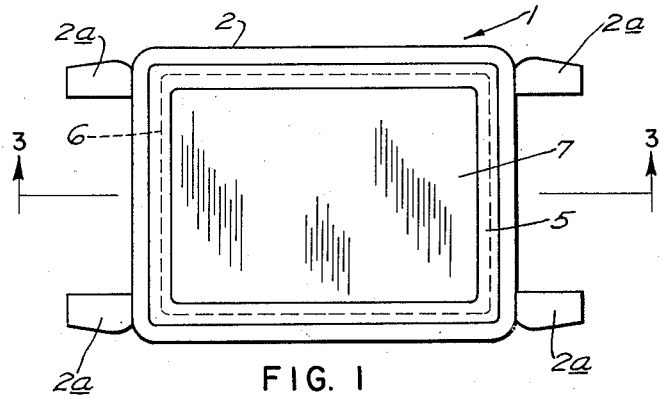
Fig. 1 is a top plan view of a watch case embodying the present invention.
Figure 2:
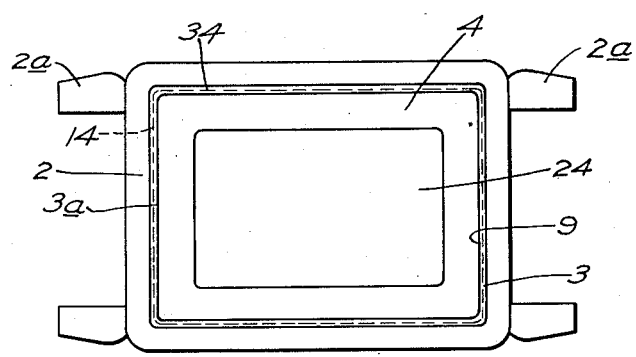
Fig. 2 is a bottom plan view of the case of Fig. 1.
Figure 3:
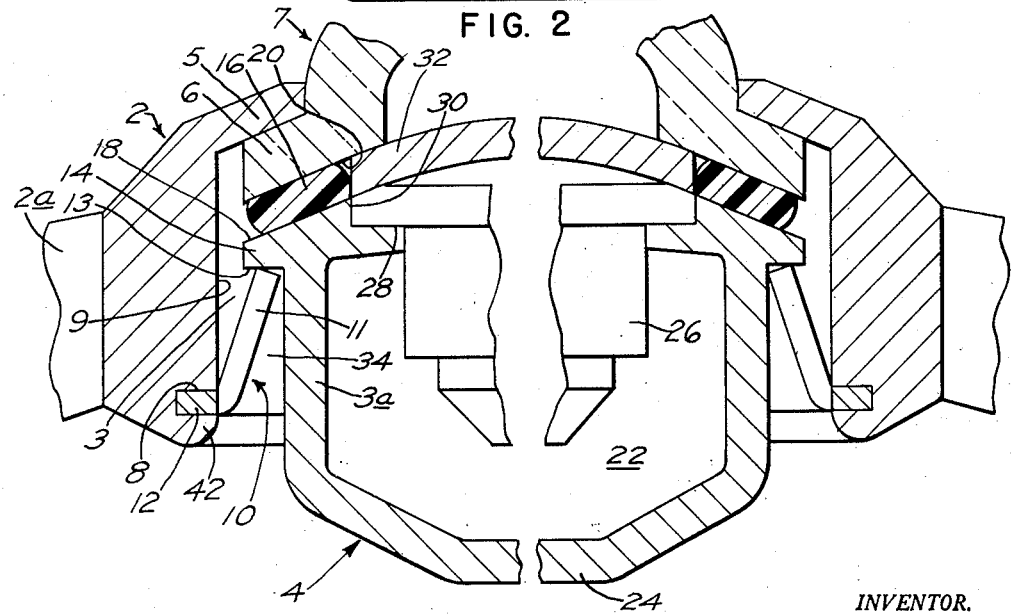
Fig. 3 is an enlarged section taken along the line 3—3 of Fig. 1.

With reference to Figs. 1 to 10, 1 is a rectangular shaped watch case comprising a rectangular hollow body 2 having a rectangular cavity 3 passing therethrough which is adapted to receive the rectangular side wall 3a of the hollow rectangular back 4. Body 2 also has lugs 2a for attaching the casing to a watch band and an inturned flange 5 extending over the annular peripheral flange 6 of rectangular crystal 7 which encloses the top opening of the cavity 3. Seated in a recess 8 in the wall 9 of cavity 3 is a rectangular detent ring or band 10 made of a resilient material such as spring steel and having spring fingers 11 which extend upwardly from a base 12, located within the annular recess 8 in the cavity wall, into the cavity 3. The top edges of fingers 11 engage the underside 13 of outwardly extending lip 14 of side wall 3a when the back member 4 is positioned in cavity 3 in the position shown, to lock the back member 4 in such position with the annular sealing ring 16 and flange 6 pressed tightly between the underside of flange 5 and the sealing surface 18 at the top of wall 3a whereby the sealing ring 16 is compressed between sealing surface 18 of wall 3a and the sealing surface 20 of flange 6 and provides an effective seal against the entry of air or other fluid into the enclosure 22, which is formed by the inside surfaces of crystal 7, sealing ring 16, side wall 3a and the rear wall 24 of back member 4 and in which the movement 26 is located. The movement is supported on a shoulder 28 of a recess 30 in side wall 3a and the engagement of the inner portion of surface 20 with the upper surface of the peripheral portion of the dial face 32 when the back is locked in the position shown in Fig. 3 holds the movement and face firmly in place on the shoulder.

Thus, the detent ring 10 effectively locks the back 4 and body 2 together in a water-proof, dust-proof and air-tight manner.

Figure 4:
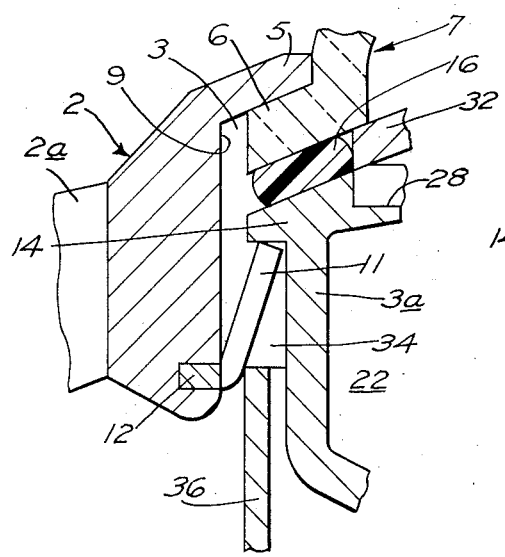
Fig. 4 is a view similar to Fig. 3 showing one side of the case and the release tool as it is being inserted into the space between the body and back of the watch to release the detent mechanism.
Figure 5:
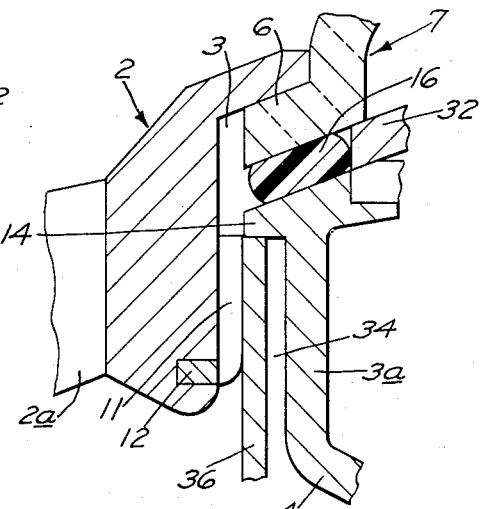
Fig. 5 is a view similar to Fig. 4 just after the detent mechanism has been released by the release tool.

The periphery of wall 3a below lip 14 is spaced from the cavity wall to provide a space 34. When it is desired to remove the back 4 from the cavity 3 to repair the watch, the rectangular shaped knife portion 36 of release tool 38 is inserted as shown in Fig. 4 in the space 34 between the outer prepihery of side wall 3a and the wall 9 of cavity 3 and moved upwardly to the position shown in Fig. 5 to force the spring fingers 11 outwardly and out of engagement with the underside 13 of lip 14 against the resilient force exerted by the resiliency of the spring steel of the ring, whereafter by pushing downwardly on the top of the crystal 7 in the direction shown by the arrow in Fig. 6, crystal 7, sealing ring 16, and back 4 are all moved from the position shown in Fig. 5 to the position shown in Fig. 6 in which the upper edges of the fingers 11 engage the underside of the flange 6 of crystal 7, whereafter the back 4 is completely removed from the cavity, the crystal 7 being retained therein by fingers 11. During the initial part of the movement of the back 4 from the position shown in Fig. 5 to that shown in Fig. 6, the underside 13 of lip 14 is moved below the edges of the fingers 11. The periphery of lip 14 is spaced from the cavity wall 9 so that the lip can move past the fingers 11 when they are in the position shown in Fig. 5. Space 34 between the periphery of wall 3a below lip 14 and the cavity wall is wide enough to accommodate both knife portion 36 and the fingers 11 when they are in the position shown in Fig. 5. To aid the fingers 11 to retain the crystal in the cavity the periphery of flange 6 may be extended beyond the periphery of lip 14 but this is not necessary since the resiliency of the fingers is enough to cause the top edges thereof to engage the underside of flange 6 when it reaches the position shown in Fig. 6.

Figure 6:
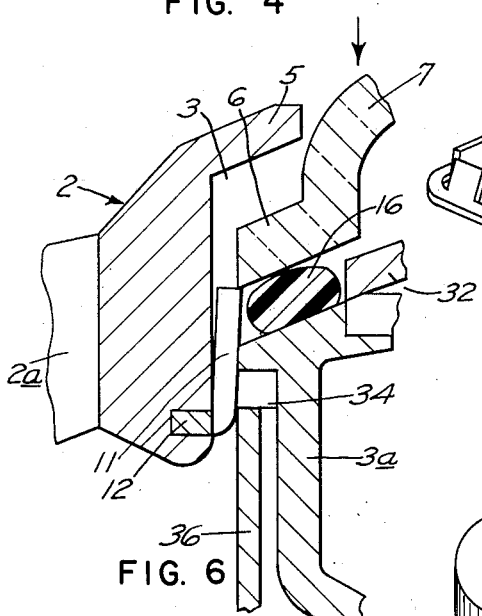
Fig. 6 is a view similar to Fig. 4 after the detent lock has been released and the back member of the case is being removed from the body cavity.
Figure 7:
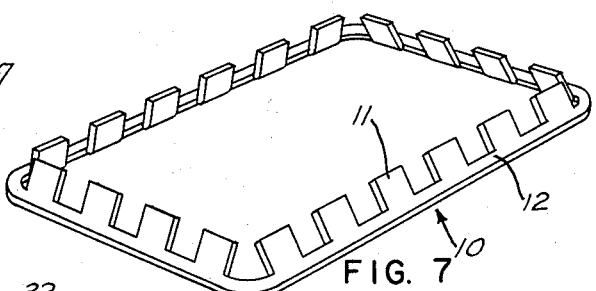
Fig. 7 shows in perspective the detent ring of Fig. 3.
Figure 8:
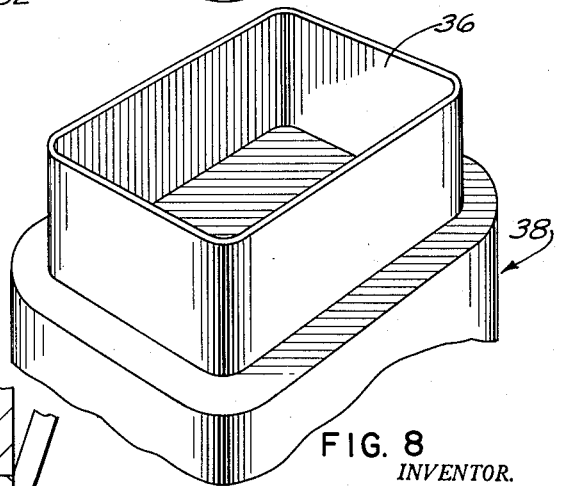
Fig. 8 shows in perspective the release tool of Fig. 3.

To again lock the back 4 in the cavity 3 wall 3a is inserted in the cavity in the position shown in Fig. 6 and the back is moved in the direction shown by the arrow in dotted lines in Fig. 6 until the underside 13 of the lip 14 clears the upper edges of spring fingers 11, whereupon the spring fingers snap into engagement with the underside 13 of lip 14, as shown in Fig. 4, to lock the back in the position shown in Fig. 4. During movement of the back into the cavity, the outer periphery of lip 14 forces the fingers 9 outwardly out of the path thereof, as shown in Fig. 6 until the underside 13 of lip 14 clears the top edges of the fingers so that the back is moved into the cavity against the resilient inward force exerted by the fingers.

Figures 9, 10:
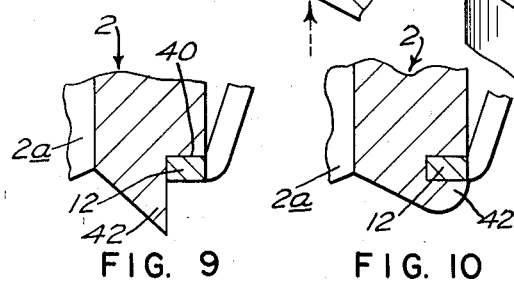
Fig. 9 is a view similar to Fig. 4 showing only a portion of the body and detent ring during assembly thereof before the bottom of the body is peened over to form a support for the ring.
Fig. 10 is the same as Fig. 9 showing the bottom of the body after it has been peened over.

Ring 10 is assembled in body 2 by placing the base 12 against the shoulder 40 of a notch in the bottom of body 2 as shown in Fig. 9 and then peening the lip 42 over the base to the position shown in Fig. 10, whereby a recess 8 is formed in which the base 12 is supported.

The sealing ring 16 is made out of any flexible, resilient and elastic sealing material, such as natural or artificial rubber, or a resilient, flexible, elastic artificial resin, such as polyethylene or other vinyl resins which are known to be suitable for making sealing rings or gaskets.

The embodiment shown in Figs. 11 and 12 is like that shown in Figs. 1 to 10 except that a rectangular, spring ring 44 split at 46 is used instead of a ring with spring fingers. The split ring is wedge shaped in cross section and the inner surface 48 is tapered downwardly and outwardly to provide a detent corner 50. It is located in the annular recess 52 in the cavity wall with the corner 50 jutting out into the cavity 53 of body member 72 and the tapered surface 48 facing the side wall 57 of back member 58, as shown. The height of the ring is such that the corner 50 engages the underside 54 of lip 56 of side wall 57 to lock the back 58 in the position shown in Fig. 11 with the sealing ring 60 and the peripheral flange 62 of the crystal 64 pressed between the top surface 68 of back 58 and the bottom surface of inwardly extending flange 70 of body member 72, whereby ring 60 is compressed between the surface 68 and the underside of flange 62 and an effective seal is provided sealing the inside 74 of the casing from the atmosphere. By inserting the knife portion 36 of the release member 38 in the space 76 between the cavity wall and the periphery of the wall 57 and moving it upwardly into the space, it engages the sloped surface 48 and forces ring 44 to spread outwardly into recess 52 until the corner 50 is moved out of engagement with the underside 54 of the lip 56. The back can then be pushed partially out of the cavity by pushing downwardly on the crystal 64 until the underside 54 is moved below corner 50, whereafter the back can be completely removed from the cavity. The corner 50 retains the crystal in the cavity. To assemble the case again side wall 57 is inserted in the cavity and moved to the position shown in Fig. 11. In moving to that position, the periphery of lip 56 engages the tapered surface 48 and forces the ring to spread outwardly into the cavity 52 out of the path of the back until the underside 54 of the lip moves past corner 50, whereupon the ring contacts and corner 50 springs into locking engagement with the underside 54 of the lip to lock the back in the cavity in the position shown in Fig. 11.

The embodiment of Figs. 13 and 14 is like that of Figs. 11 and 12 except that the spring ring 80, split at 82, has a different cross sectional shape which is curvilinear at 83 and straight at 84, the annular recess 92 in the cavity wall is curvilinear in cross sectional shape to accommodate the curvilinear shape of ring 80, the top sealing surface of the back is provided with an annular recess 88 and the lower sealing surface of the crystal flange is provided with an annular ridge 90 opposite the recess 88. The straight surface 84 of ring 80 is tapered downwardly and outwardly as shown to provide a corner 86 which juts inwardly into the cavity, as shown, to engage the underside of the lip of the back member and lock it in the cavity of the body member in the position shown in Fig. 13 with the sealing ring and crystal flange pressed between the top of the back member and the inwardly extending flange of the body member. The annular recess 92 is large enough to permit the ring to be expanded thereinto when the knife edge 36 is inserted into the space between the side wall of the back and the cavity wall and pushed upwardly to engage the tapered surface 84 of the ring and force it to expand until corner 86 is moved out of engagement with the underside of the lip of the side wall of the back member, whereupon the back can be removed from the cavity as described above with reference to Figs. 11 and 12. To reassemble the case, the back is inserted in the cavity and moved to the position shown in Fig. 13. In moving to that position the periphery of the lip of the back member engages the tapered side 84 of the ring forcing it to expand into the recess 92 until the underside of the lip clears the corner 86, whereupon the ring automatically contracts and the corner 86 springs into engagement with the underside of the lip to lock the back in the position shown in Fig. 13 with the sealing ring pressed into sealing relationship between the top surface of the back and the lower surface of the flange of the crystal. Recess 88 is triangular in shape and the ridge 90 is curvilinear in cross sectional shape.

The embodiment of Figs. 15 and 16 is like that shown in Figs. 11 and 12 except for the detent ring and the sealing surfaces of the crystal flange and the back member. The annular detent ring 100 comprises two halves 102 each of which has a cross sectional shape similar to the numeral 7. The two halves of the ring are forced into contracted position, as shown in Fig. 15, by a sinuous, annular spring 103 which is split at 105, which is located in the recess 104 formed by the juncture of the two legs 106 and 108 of the ring and which is biased between the wall 114 of the recess 116 and the ring. The outwardly bulged portions 112 of the spring engage the recess wall 114 and the inwardly bulged portions 110 engage the ring. The inner surface 118 of the vertical leg 108 is tapered downwardly and outwardly to form with leg 106 a detent corner 120 for engaging the underside of the lip 122 of the side wall 123 of the back member 125 and locking it in the sealing position shown in Fig. 15 with the sealing ring 124 pressed between the underside of flange 126 of crystal 128 and the top of the back 123. The taper of the surface 118 permits the knife portion of the release member, when inserted between the wall of the cavity and the periphery of the side wall 123, to spread the two halves of the ring and the legs of each half outwardly into the recess 116 and out of the cavity against the force of the spring 103 until the detent corner 120 is forced out of engagement with the underside of the lip, whereupon the back can be removed in the manner described above with reference to the other embodiments. To reassemble the case, the back is inserted into the cavity of the body member and moved to the position shown in Fig. 15. As the back is moved into the cavity, the lip forces the ring to spread until the underside of the lip clears the corner 120, whereupon the corner snaps into engagement with the underside of the lip and locks the back in the cavity in the position shown in Fig. 15. The lower corner of the flange 126 of the crystal is beveled at 130 and a recess 132 is provided in the top sealing surface of the back member. The sealing ring 124 may be shaped to conform with the contours of the sealing surfaces of the crystal flange and back.

The embodiment of Fig. 17 is like that of Fig. 15 except that the movement 136 is supported on a separate movement ring 138 which is carried by the back 125 and the inwardly extending top flange of the side wall in the other embodiments is omitted. A portion of sealing ring 124a is compressed between the top surface of the movement ring and the underside of the crystal flange 126 and the contour of the top sealing surface of the back member is different in shape than the corresponding surface in Fig. 15.

Figure 22:
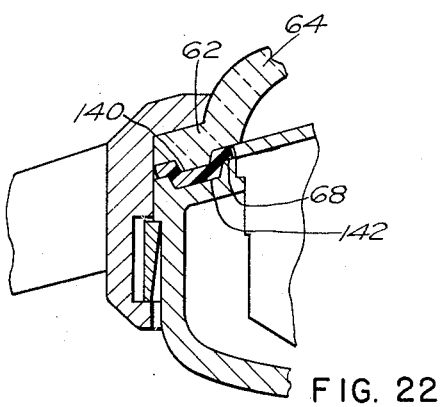
Fig. 22 is a view similar to Fig. 11 showing a different construction of the sealing ring and surfaces coming into contact therewith.
Figure 23:
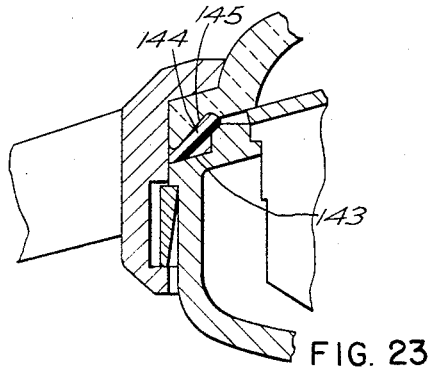
Fig. 23 is a view similar to Fig. 11 showing yet a different construction of the sealing ring and surfaces coming into contact therewith.
Figure 24:
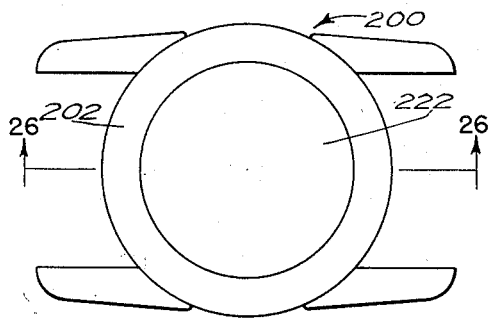
Fig. 24 is a top plan view of another embodiment of the present invention.
Figure 25:
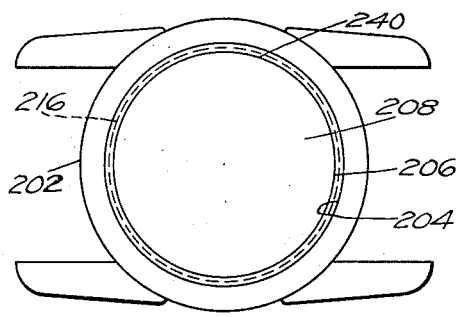
Fig. 25 is a bottom plan view of the apparatus of Fig. 24.
Figure 26:
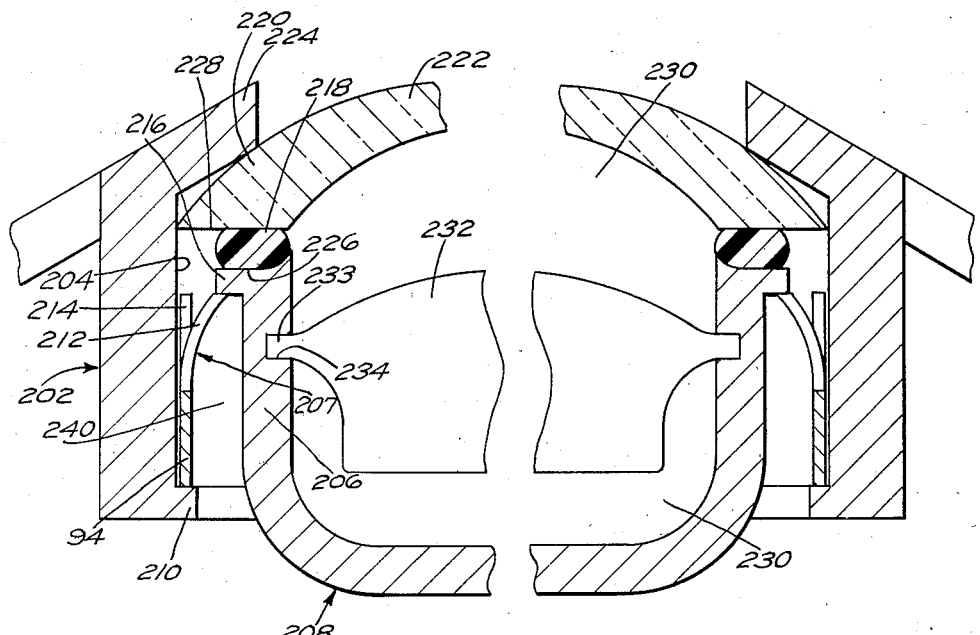
Fig. 26 is an enlarged section taken along the line 26—26 of Fig. 24.

The embodiments of Figs. 22 and 23 are like that of Fig. 11 except for the contours of the lower surfaces of the crystal flanges and the top surfaces of the side walls of the backs. In Fig. 22, a trapezoidal shaped, annular projection 140 is provided in the lower sealing surface of the flange 62 of the crystal 64 and a trapezoidal shaped recess 142 is provided in the top sealing surface 68 of the back opposite the trapezoidal projection 140. In Fig. 23 the contours of the lower surface 145 of the crystal flange and the upper surface 143 of the back and the cross sectional shape of the sealing ring 144 are different.

Figure 18:
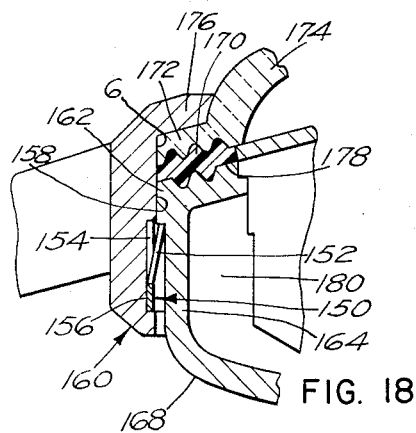
Fig. 18 is a view similar to Fig. 4 showing yet another embodiment of the present invention.
Figure 19:
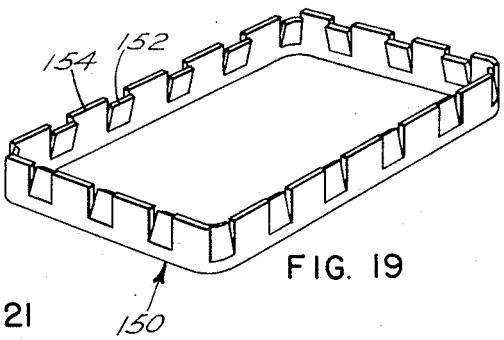
Fig. 19 is a view in perspective of the detent ring of Fig. 18.

The embodiment of Figs. 18 and 19 is like that of Fig. 11 except for the detent ring and the contours of the sealing surfaces of the crystal flange and the back member. Detent ring 150 is provided with spring fingers 152 extending inwardly and upright fingers 154 and is supported in the recess 156 in cavity wall 158 of the cavity in body member 160 so that the inturned spring fingers 152 extend into the cavity and engage the underside of lip 162 of the side wall 164 of back 168 to lock the back in the cavity in the position shown in Fig. 18 with the sealing ring 170 and the peripheral flange 172 of crystal 174 pressed tightly between the underside of inturned flange 176 of body 160 and the top corrugated sealing surface 178 of side wall 164, whereby sealing ring 170 is compressed between the lower corrugated surface of flange 172 and the top corrugated surface 178 of back 168 and the enclosure 180 of the casing formed by the back 168 and crystal 174 is sealed off from the atmosphere. The casing is taken apart in the manner described above with reference to the other embodiments by inserting the knife portion 36 of the release tool 38 in the space between the periphery of the side wall 164 and the cavity wall to engage fingers 152 and force them outwardly into the recess and out of engagement with the underside of lip 162, whereby the back can be pushed out of the cavity sufficiently to move the underside of the lip 162 below the top edges of fingers 152 by applying pressure on the top of the crystal, whereafter the back can be completely removed from the cavity. The fingers 154 retain the crystal in the cavity after the back is removed. To assemble the casing, the side wall of the back is moved into the cavity until the underside of the lip clears the top of the fingers 152 whereupon they move into engagement with the underside of lip and lock the back into the cavity in the position shown in Fig. 18.

Figure 20:
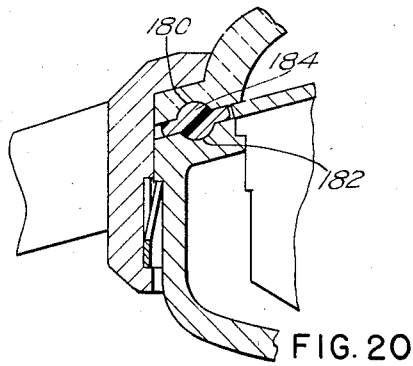
Fig. 20 is a view similar to Fig. 18 showing a different construction of the sealing ring and surfaces coming into contact therewith.

The embodiment of Fig. 20 is like that of Figs. 18 and 19 except that the bottom sealing surface of the crystal flange and the top sealing surface of the back are provided with recesses 180 and 182, which are curvilinear in shape and face each other and the sealing ring 184 is shaped to conform with the contours of the recesses, although it is not necessary that this sealing ring be so shaped before assembly.

Figure 21:
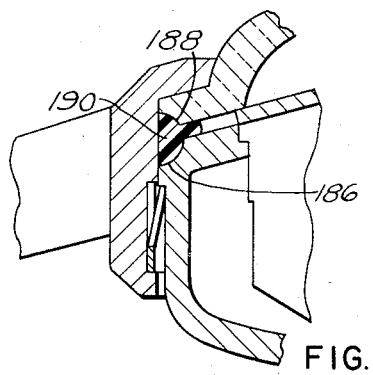
Fig. 21 is a view similar to Fig. 18 showing another different construction of the sealing ring and surfaces coming into contact therewith.

The embodiment of Fig. 21 is like that of Fig. 20 except that the recesses 186 and 188 and the sealing ring 190 are shaped differently.

Figs. 24 to 31 show a round case 200 the hollow body member 202 of which is round in cross-sectional shape and has a cavity 204 which is also round in cross-sectional shape and which receives the side wall 206 of hollow back member 208. The periphery of the side wall is round in cross-sectional shape. The detent ring 207 is carried by the cavity wall and is supported on the peened over lip 210 of the body 202. It is round but otherwise like the detent ring of Fig. 19, having turned-in spring fingers 212 and upright fingers 214. The inturned fingers 212 extend upwardly and into the cavity 204 and engage the underside of annular lip 216, extending outwardly from and around the periphery of side wall 206, to lock the back 208 in the cavity in the position shown in Fig. 26 with the annular sealing ring 218 and the peripheral portion 220 of the crystal 222 pressed tightly between the underside of the annular turned-in flange 224 and the top surface 226 of side wall 206, whereby the sealing ring is compressed between the sealing surface of the crystal and the sealing surface 226 of the side wall 206 and the enclosure 230 in the casing is sealed off from the atmosphere. The movement 232 is located in enclosure 230 and is supported by a flange 233 extending outwardly therefrom and into a recess 234 in the side wall 206. The back is removed from the body by inserting the cylindrical shaped knife portion 236 of the release tool 238 in the space 240 between the outer periphery of side wall 206 and the cavity wall 204, as shown in Fig. 27, and moving it to the position shown in Fig. 28 in which it forces the spring-fingers 212 out of engagement with the underside of the lip 216, whereupon pressure applied to the top of the crystal in the direction shown by the arrow in Fig. 29 moves the crystal, back and sealing ring to the position shown in Fig. 29, in which the underside of the lip is below the top edges of the fingers 212. Thereafter, the back can be entirely removed from the cavity. The top edges of straight fingers 214 retain the crystal 222 in the cavity when the back is removed therefrom. To put the case together again, it is necessary only to insert the side wall 206 into the cavity and move it to the position shown in Figs. 26 and 27. During movement of the back into the cavity the lip 216 forces the fingers 212 out of its path until the underside of the lip clears the top of the spring fingers 212, whereupon the spring fingers spring inwardly under the lip to engage the same and lock the back in the sealing position shown in Fig. 26. The top edges of the fingers 214 should be spaced far enough from the surface 220 of crystal 222 to permit sufficient movement of the crystal in the cavity, during disassembly and while the fingers 212 are held out of engagement with the lip by knife portion 236, to move the underside of lip 216 downwardly past the edges of the spring fingers 212 so that they cannot engage the underside of the lip and lock the back in the cavity even though the knife portion 236 is removed from the casing.

The term "ring" and "annular," as used herein, includes any polygonal or curvilinear shape or any combination thereof, as for example a hexagon, a square, an octagon, an oval and other irregular shapes, the term "irregular" referring to any shape which is not circular.

I claim:

1. A watch case comprising a hollow back member and a hollow body member, one of said members having a side wall and the other having a cavity adapted to receive said side wall, one of said side walls and a wall of said cavity having a detent engaging portion and the other having associated therewith resilient detent means resiliently urged into engagement with said detent engaging portion when said side wall is in a predetermined position in said cavity to positively lock said one member in said cavity in said predetermined position, the portion of said side wall adjacent the cavity opening which receives said side wall being spaced from the wall of the cavity to receive a release member, said detent means being movable out of said engagement by inserting said release member into said space to engage and force said detent means out of engagement with said detent engaging portion against the resilient force urging it into said engagement, whereupon said detent engaging portion is movable from said predetermined position past said detent means to a position in which said detent engaging portion is no longer engageable by said detent means and said one member is removable from said cavity, said side wall being free to be moved into said cavity until it reaches a position in which said detent engaging portion is engageable by said detent means, whereupon said detent means is automatically urged into engagement with said detent engaging portion to lock said one member in said cavity in said predetermined position, said other member being provided with a flange portion, a crystal forming a closure over an open end of the cavity and having a peripheral portion located between said side wall and said flange portion when said members are locked together, a sealing member located between said peripheral portion of said crystal and said side wall, said predetermined position being one in which said side wall is forced into sealing relationship with said sealing member and said peripheral portion of said crystal and in which said peripheral portion of said crystal and said sealing member are pressed between the flange portion of said body member and said side wall, whereby said sealing member is compressed between the peripheral portion of the crystal and the back member to effectively seal the interior of the casing from the atmosphere, said cavity being in said body member, said flange of said body member extending inwardly at one end of said cavity, the hollow interior of said back member, the crystal and sealing member forming an enclosure in which a watch movement is adapted to be located and which is sealed off from the atmosphere when said back member is in said position, said detent means being carried by the wall of said cavity, said detent means extending and being resiliently urged into said cavity, said detent means comprising a resilient ring member which extends a substantial distance around and is supported by said cavity wall, said detent means being spaced from said crystal and including means for retaining said crystal in the cavity when said back member is removed therefrom.

2. A watch case comprising a hollow back member and a hollow body member, one of said members having a side wall and the other having a cavity adapted to receive said side wall, one of said side walls and a wall of said cavity having a detent engaging portion and the other having associated therewith resilient detent means resiliently urged into engagement with said detent engaging portion when said side wall is in a predetermined position in said cavity to positively lock said one member in said cavity in said predetermined position, the portion of said side wall adjacent the cavity opening which receives said side wall being spaced from the wall of the cavity to receive a release member, said detent means being movable out of said engagement by inserting said release member into said space to engage and force said detent means out of engagement with said detent engaging portion against the resilient force urging it into said engagement, whereupon said detent engaging portion is movable from said predetermined position past said detent means to a position in which said detent engaging portion is no longer engageable by said detent means and said one member is removable from said cavity, said side wall being free to be moved into said cavity until it reaches a position in which said detent engaging portion is engageable by said detent means, whereupon said detent means is automatically urged into engagement with said detent engaging portion to lock said one member in said cavity in said predetermined position, said other member being provided with a flange portion, a crystal forming a closure over an open end of the cavity and having a peripheral portion located between said side wall and said flange portion when said members are locked together, a sealing member located between said peripheral portion of said crystal and said side wall, said predetermined position being one in which said side wall is forced into sealing relationship with said sealing member and said peripheral portion of said crystal and in which said peripheral portion of said crystal and said sealing member are pressed between the flange portion of said body member and said side wall, whereby said sealing member is compressed between the peripheral portion of the crystal and the back member to effectively seal the interior of the casing from the atmosphere, said cavity being in said body member, said flange of said body member extending inwardly at one end of said cavity, the hollow interior of said back member, the crystal and the sealing member forming an enclosure in which a watch movement is adapted to be located and which is sealed off from the atmosphere when said back member is in said position, said detent means being carried by the wall of said cavity, said detent means extending and being resiliently urged into said cavity, said detent engaging portion comprising the underside of a lip extending outwardly from said side wall toward said cavity wall, said sealing member being compressed between a sealing upper surface of said side wall and a sealing surface of said peripheral portion of said crystal by said resilient detent means when said members are locked in said predetermined position, said detent means comprising a split ring which is supported in a recess in said cavity wall, which extends into said cavity and which has a recess around the periphery thereof and a spring located in said last mentioned recess to resiliently force the ring into engagement with said detent engaging portion of said back member.

References Cited in the file of this patent

FOREIGN PATENTS

| | | |
|---|---|---|
| 220,262 | Switzerland | July 1, 1942 |
| 237,038 | Switzerland | July 16, 1945 |
| 258,894 | Switzerland | May 16, 1949 |